United States Patent [19]

Kumaoka

[11] Patent Number: 4,652,376
[45] Date of Patent: Mar. 24, 1987

[54] METHOD FOR DISPOSING EMULSIFIABLE OIL-CONTAINING WASTE WATER

[75] Inventor: Shunichi Kumaoka, Tokyo, Japan

[73] Assignee: Filton International Co., Tokyo, Japan

[21] Appl. No.: 702,169

[22] Filed: Feb. 15, 1985

[51] Int. Cl.⁴ ............................................. C02F 1/28
[52] U.S. Cl. .................................. 210/694; 210/799
[58] Field of Search ............... 210/691, 694, 708, 799, 210/DIG. 5

[56] References Cited

U.S. PATENT DOCUMENTS 3,770,628 11/1973 Yamamoto et al. ............... 210/694
3,830,371 8/1974 Garcia .......................... 210/DIG. 5
4,129,500 12/1978 Jeffreys et al. ..................... 210/799
4,374,029 2/1983 Jaisinghani ....................... 210/799

Primary Examiner—Ivars Cintins
Attorney, Agent, or Firm—Armstrong, Nikaido, Marmelstein & Kubovcik

[57] ABSTRACT

Emulsifiable oil-containing waste water is disposed by bringing said waste water into contact with a filter medium comprising a mixture of carbon and powder or granule of a porous ceramic by gravity filtration or pressure filtration, said porous ceramic being prepared by adding a void-forming material to a mixture of at least two members selected from clay, silica and aluminum hydroxide and firing the resulting mixture to form a porous ceramic mainly composed of silicon oxide and aluminum oxide.

5 Claims, 1 Drawing Figure

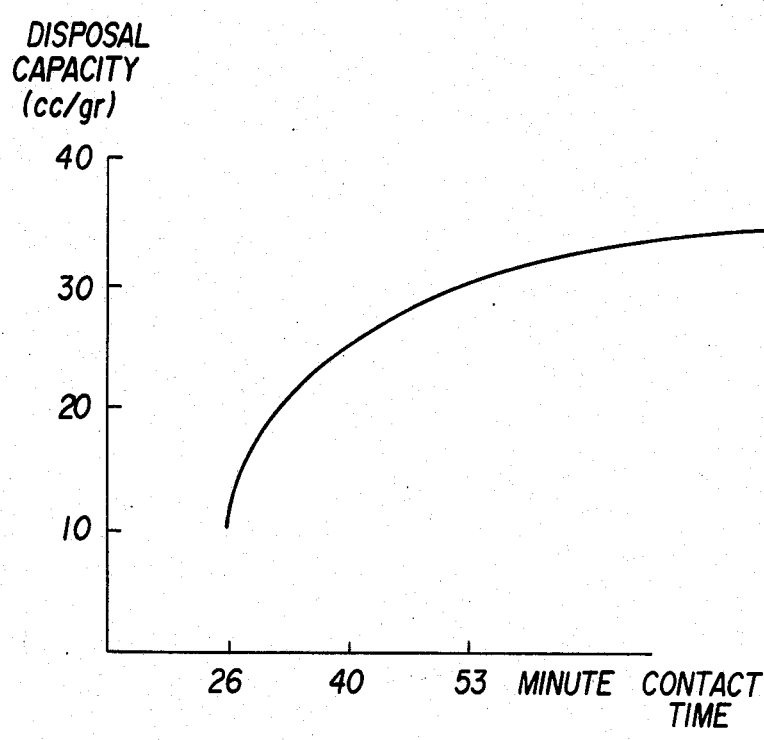

METHOD FOR DISPOSING EMULSIFIABLE OIL-CONTAINING WASTE WATER

BACKGROUND OF THE INVENTION

1. Field of the Invention

The present invention relates to a method for disposing emulsifiable oil-containing waste water.

2. Description of Prior Art

Methods for disposing emulsifiable oil-containing waste water which have been attempted heretofore include agglomeration, electrolysis, and adsorption. However, no satisfactory method has been developed as yet. For example, though the separation of oils is possible in the agglomeration and electrolysis methods, they have a difficulty in the removal of surfactants. The adsorption method is poor in efficiency when waste water with a high degree of contamination is to be disposed.

SUMMARY OF THE INVENTION

It is an object of the present invention to provide a method which enables disposal of emulsifiable oil-containing waste water.

It is another object of the present invention to provide a method which enables disposal of emulsifiable oil-containing waste water by bringing it into contact with a filter medium by means of gravity filtration or pressure filtration.

It is still another object of the present invention to provide a method for disposing emulsifiable oil-containing waste water, which can be easily carried out.

BRIEF DESCRIPTION OF THE DRAWING

FIG. 1 is a graph showing the disposal capacity of the filter medium according to the present invention.

DETAILED DESCRIPTION OF THE INVENTION

To attain the above-mentioned purposes, the present invention provides a method for disposing emulsifiable oil-containing waste water, which comprises bringing said emulsifiable oil-containing waste water into contact with a filter medium by means of gravity filtration or pressure filtration, said filter medium being prepared by adding a void-forming material to a substrate composed of at least two members selected from the group consisting of clay, silica and aluminum hydroxide, firing the resulting mixture to form a porous ceramic mainly composed of silicon oxide and aluminum oxide and adding carbon to the powder or granule of said ceramic.

The method for disposing emulsifiable oil-containing waste water according to the present invention is based on a finding such that when emulsifiable oil-containing waste water is passed through a filter medium composed of a porous ceramic and carbon such as activated carbon in the form of a mixture, oils and surfactants present in the waste water can be effectively removed, said porous ceramic being prepared by using a substrate composed of at least two members selected from the group consisting of clay, silica and aluminum hydroxide, for example, clay and silica, adding aluminum hydroxide and a void-forming material thereto and firing the resulting mixture.

The term "porous ceramic" as used herein refers to a porous ceramic product prepared by using, as a substrate, a mixture of at least two members selected from the group consisting of clay, silica and aluminum hydroxide, for example, a mixture of clay and silica, or a mixture of clay, silica and aluminum hydroxide, adding a void-forming material such as sawdust or rice hull to said mixture, drying the resulting mixture in the form of block or in an appropriate form and firing it, whereby the void-forming material is burnt out to form a porous ceramic. In the present invention, the powder or granule of this ceramic is used. When using the three components of clay, silica and aluminum hydroxide as the starting materials for the ceramic, their loadings are 20 to 70, 70 to 20, and 10% by weight, respectively, and about 100 to about 140% by weight of sawdust is added thereto. After water is added thereto, the mixture is stirred well, air-dried or forcedly dried to a given level, and fired at a temperature of 1,200° to 1,350° C. to produce a porous ceramic mainly composed of silicon oxide and aluminum oxide.

Preferred contents of silicon oxide and aluminum oxide in the ceramic are 80 to 45 and 15 to 40% by weight, respectively. It was found that a porous ceramic containing silicon oxide and aluminum oxide in quantities less than the lower limit as specified above, i.e., silicon oxide in a quantity of less than 45% by weight and aluminum oxide in a quantity of less than 15% by weight, or in quantities more than the upper limit as specified above, i.e., silicon oxide in a quantity of more than 80% by weight and aluminum oxide in a quantity of more than 40% by weight, is unsuitable for use in the present invention.

The porous ceramic use in the present invention is powder or granule of a product mainly composed of silicon oxide and aluminum oxide obtained by firing a mixture of at least two members selected from clay, silica and aluminum hydroxide at an elevated temperature of about 1300° C.

In the practice of the present invention, it is preferred to use a filter medium comprising a mixture composed of about 10 to above 70% by weight of the ceramic powder or granule and about 90 to about 30% by weight of carbon such as activated carbon. A filter medium comprising a mixture of the ceramic and carbon in the range of a mixing ratio as specified above is preferred. It was found that when the quantity of any of them is excessively reduced, for example, when the quantity of the ceramic itself is reduced, emulsifiable oil components can not be removed.

As described above, the present invention enables emulsifiable oil-containing waste water to be disposed by bringing the waste water into contact with a filter medium by means of gravity filtration or pressure filtration, said filter medium being prepared by firing a mixture of at least two members selected from clay, silica and aluminum hydroxide to form a porous ceramic and mixing powder or granule of the ceramic with carbon such as activated carbon. It is also possible that an appropriate filter medium such as inorganic foam or filter paper is provided as a pretreatment stage to the filter medium of the present invention to remove impurities and suspended matters other than emulsifiable oil components in the waste water, thus preventing the filter medium from being clogged.

The following example will further illustrate the present invention in more detail.

EXAMPLE

It can be verified by the following experiments that the disposal of emulsifiable oil-containing waste water is made possible by the use of the mixture of carbon such as activated carbon and the porous ceramic powder or granule according to the present invention.

(1) Bilge-like waste water was used as emulsifiable oil-containing waste water to be disposed. Three kinds of bilge-like waste water serving as untreated waters A, B, and C having the following compositions were prepared.

Untreated water A:
① saline water (prepared by dissolving 3 wt.% of natural common salt) ... 100 l
② waste oil of a gasoline engine ... 60 cc
③ emulsifier ... 120 cc
Note: the emulsifier was a nonionic/anionic surfactant.

Untreated water B:
Only the concentrations of the oil component and the emulsifier in the composition of the untreated water A were varied, and the same saline water as that of the untreated water A was used.
① saline water ... 100 l
② waste oil of a gasoline engine ... 500 cc
③ emulsifier ... 300 cc Untreated water C:
① fresh water ... 100 l
② waste oil of a gasoline engine ... 500 cc
③ emulsifier ... 300 cc (2) Filter medium
100 kg of sawdust as a void-forming material was mixed with a mixture of 50 kg of clay, 50 kg of silica and 340 l of water. The mixture was shaped to a brick, air-dried to evaporate 80 to 90% of water and then fired at 1350° C., whereby the sawdust was burnt out and left voids behind. Thus, a block of a porous ceramic was formed. The ceramic was ground into a granule, and 60% by weight of the granule was mixed with 40% by weight of activated carbon powder to form a filter medium. 350 g of the filter medium was packed in a cylindrical tube of 80 mm in inner diameter and 70 mm in height, and a meshy material was fixed to each of the upper and lower sides of the tube so as to present the granule from dropping out of the tube, whereby a filter device was obtained. Untreated water A was passed through the filter device at a flow rate of 200 cc/min under a pressure of 0.4 kg/cm²G. After two min, the water A was clarified. 75 g of the filter medium was packed in a tube of 40 mm in inner diameter and 60 mm in height, and a gauze was fixed to each of the upper and lower sides thereof. 5 l of the water A was passed therethrough at a flow rate of 100 cc/min. After one min, the water was clarified and it was confirmed that the emulsified oil component in the emulsifiable oil-containing waste water was removed.

3.52 kg of the filter medium was packed in a cylindrical tube of 80 mm in inner diameter and 700 mm in height and a guage was fixed to each of the upper and the lower sides thereof to form a filter device. 5 l of untreated water B was passed therethrough by gravity, to examine the number of times of the passage of water through the filter required for obtaining crystal-clear water. The results are as follows:

| Number of times of passage of water through filter | Quantity of water passing through filter cc/min | Treated water |
| --- | --- | --- |
| 1 | 970 | brownish milky white |
| 3 | 600 | milky white |
| 5 | 300 | light milky white |
| 7 | 200 | crystal clear |

Note:
Gradual reduction in the quantity of water passing through the filter is thought to be due to the clogging of the filter caused by the oil components.

It was found from these results that untreated water B could be disposed by a single pass by connecting seven cylindrical tubes with an inner diameter of 80 mm and a height of 700 mm in series. 5 l of untreated water C was disposed in a similar manner to that described above, and similar results were obtained.

500 g of the filter medium was used to examine its service life. The absolute quantity of 5 l of untreated water B was pumped up from an oil tank and passed downward through a cylindrical tube with an inner diameter of 80 mm and a height of 220 mm and containing 500 g of the filter medium. The service life was examined by measuring the time required for disposal.

(a) First experiment
5 l of untreated water B was repeatedly passed through the filter medium to determine the time required for obtaining crystal-clear water and the quantity of the filtered waste water. The time required was 2 hours and the quantity of the filtered water was 230 l.

(b) Second experiment
After the filtration experiment using 5 l of the water B described above was completed, 5 l of additional untreated water B was passed through the same filter device. It tool 2.5 hours to obtain 5 l of crystal-clear water.

(c) Third experiment
After the experiment (b) was completed, 5 l of additional untreated water B was repeatedly passed through the same filter medium. It took 4.0 hours to obtain crystal-clear water.

FIG. 1 is a graph showing these experimental results.

The graph of FIG. 1 shows that the first experiment took 2 hours to dispose 5 l of the waste water, the secone experiment took 2.5 hours, and the third experiment took 4 hours.

This means that when additional untreated water is disposed, the filter medium is caused to clog, thus reducing the disposal capacity and prolonging the disposal time.

Ad described above, the method of the present invention enables emulsifiable oil-containing waste water to be disposed by bringing said waste water into contact with a filter medium by gravity filtration or pressure filtration said filter medium being prepared by adding a void-forming material to a mixture of at least two members selected from clay, silica and aluminum hydroxide, firing the resulting mixture to form a porous ceramic and mixture powder or granule of said ceramic with carbon. Accordingly, the present invention enables the emulsifiable oil-containing waste water to be disposed merely by filtering the emulsified oil component in the waste water, that is, by passing the waste water through the filter medium comprising a mixture of carbon and the powder or granule of the ceramic containing at least two members selected from clay, silica and aluminum hydroxide, though such emulsifiable oil-containing waste water has not been easily and completely disposed in conventional manners.

What is claimed is:

1. A method for disposing emulsifiable oil-containing waste water, which comprises bringing said waste water into contact with a filter medium comprising a mixture of carbon and power or granule of a porous ceramic by gravity filtration or pressure filtration, said porous ceramic consisting essentially of silicon oxide and aluminum oxide and prepared by adding at least one void-forming material to a mixture of clay and at least one member selected from the group consisting of silica and aluminum hydroxide and firing the resulting mixture.

2. A method for disposing emulsifiable oil-containing waste water as set forth in claim 1, wherein the filter medium contains about 90 to about 30% by weight of carbon.

3. A method for disposing emulsifiable oil-containing waste water as set forth in claim 1, wherein the filter medium is composed of about 60% by weight of the ceramic and about 40% by weight of carbon.

4. A method for disposing emulsifiable oil-containing waste water as set forth in claim 1, wherein activated carbon powder is used as the carbon.

5. A method for disposing emulsifiable oil-containing waste water, as set forth in claim 1, wherein the porous ceramic contains 45–80% by weight of silicon oxide and 15–40% by weight of aluminum oxide.

* * * * *